US008666136B2

(12) United States Patent
Kolthammer

(10) Patent No.: US 8,666,136 B2
(45) Date of Patent: Mar. 4, 2014

(54) OPTIMAL ENERGY WINDOWING OF SCATTERED EVENTS IN RADIONUCLIDE IMAGING

(75) Inventor: Jeffrey A. Kolthammer, Lyndhurst, OH (US)

(73) Assignee: Koninklijke Philips N.V., Eindhoven (NL)

( * ) Notice: Subject to any disclaimer, the term of this patent is extended or adjusted under 35 U.S.C. 154(b) by 179 days.

(21) Appl. No.: 13/321,200

(22) PCT Filed: May 12, 2010

(86) PCT No.: PCT/IB2010/052122
§ 371 (c)(1),
(2), (4) Date: Nov. 18, 2011

(87) PCT Pub. No.: WO2010/146480
PCT Pub. Date: Dec. 23, 2010

(65) Prior Publication Data
US 2012/0076385 A1    Mar. 29, 2012

Related U.S. Application Data

(60) Provisional application No. 61/218,087, filed on Jun. 18, 2009.

(51) Int. Cl.
*G06K 9/00* (2006.01)
(52) U.S. Cl.
USPC ....................................................... 382/131
(58) Field of Classification Search
None
See application file for complete search history.

(56) References Cited

U.S. PATENT DOCUMENTS

| 7,330,527 B2 | 2/2008 | Hoffman et al. |
| 7,388,534 B2 | 6/2008 | Astley et al. |
| 2008/0044076 A1* | 2/2008 | Spies ............................ 382/132 |
| 2008/0226017 A1* | 9/2008 | Altman et al. .................... 378/4 |

FOREIGN PATENT DOCUMENTS

EP    0589467 A2    3/1994

OTHER PUBLICATIONS

McElroy, D. P., et al.; Singles list mode data processing for MADPET II; 2004; IEEE Nuclear Science Symposium Conference Record; vol. 5:3325-3329.
Wells, K., et al.; Optimal Energy Window Selection for Scintigraphy and Emission Computed Tomography; 2005; Nuclear Science Symposium Conference Record; vol. 4:2049-2053.

* cited by examiner

*Primary Examiner* — Barry Drennan
*Assistant Examiner* — Siamak Harandi

(57) ABSTRACT

An imaging system includes storage (12) for storing radionuclide imaging data including quantitative radiation detection event energy values, the radionuclide imaging data having been acquired of a subject by a radionuclide imaging device (10); an energy window selection module (20) selecting an energy window and a data filtering module (14) configured to filter the stored radionuclide imaging data respective to the stored quantitative radiation detection event energy values using the selected energy window to generate a filtered radionuclide imaging data set; and a reconstruction module (30) configured to reconstruct the filtered radionuclide imaging data set to generate a reconstructed image of the subject.

17 Claims, 4 Drawing Sheets

OPTIMAL ENERGY WINDOWING OF SCATTERED EVENTS IN RADIONUCLIDE IMAGING

CROSS REFERENCE TO RELATED APPLICATIONS

Figure 1:
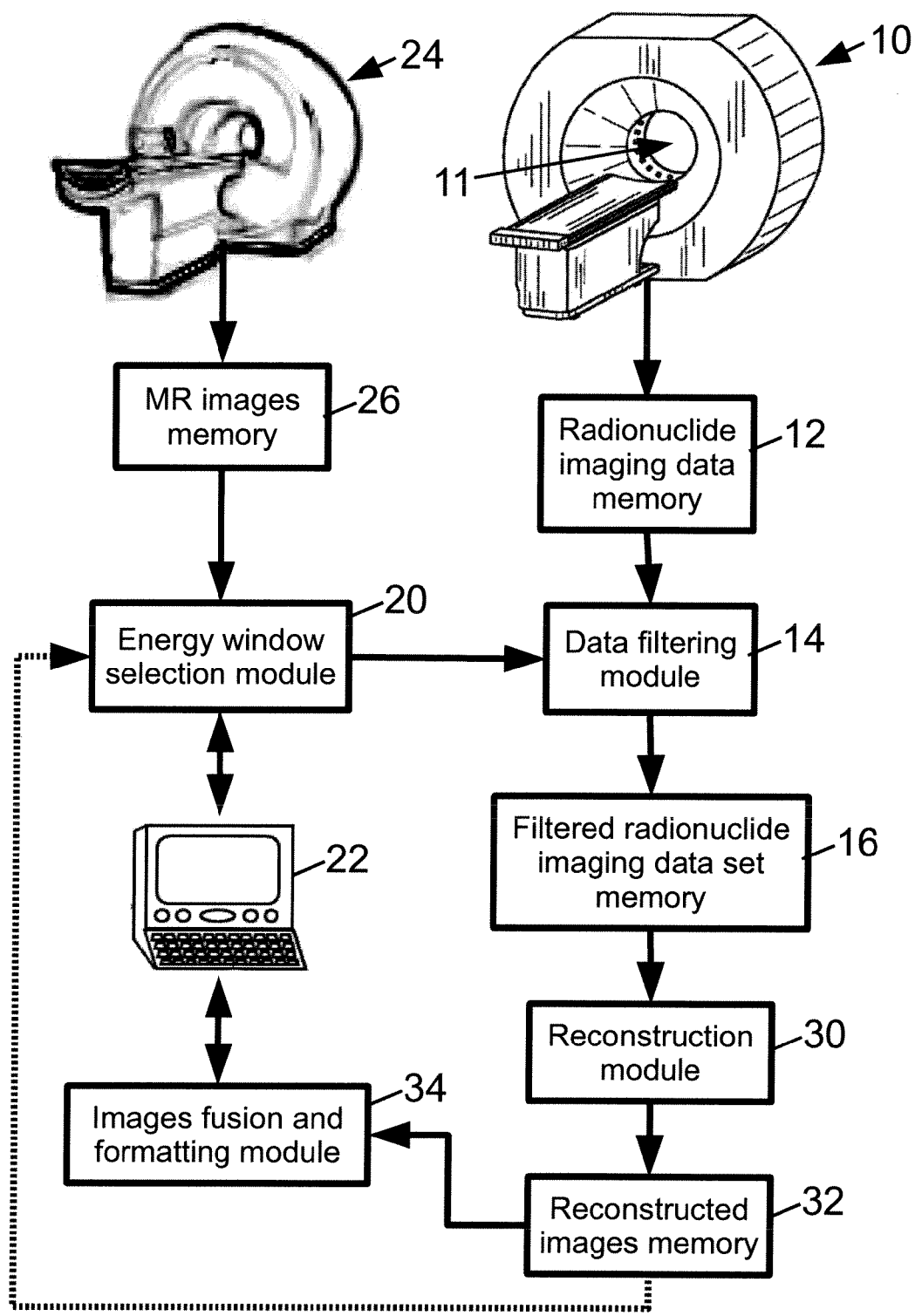

This application claims the benefit of U.S. provisional application Ser. No. 61/218,087 filed Jun. 18, 2009, which is incorporated herein by reference.

DESCRIPTION

The following relates to the medical imaging arts, radionuclide imaging arts, and related arts.

In radionuclide imaging such as positron emission tomography (PET), single photon emission computed tomography (SPECT), or so forth, a subject infused with or otherwise including an agent containing a radionuclide is monitored by proximate radiation detectors to detect radiation emitted by the radionuclide distribution in the subject. The radionuclide distribution in the subject is estimated based on the spatial distribution of the radiation detection events.

In PET, the radionuclide emits positrons that rapidly annihilate in positron-electron annihilation events each of which emit two oppositely directed 511 keV gamma rays—accordingly, in PET the detection of two substantially simultaneous 511 keV particles defines a "line of response" connecting the 511 keV particle detection events. In time-of-flight PET, the small time interval (or lack thereof) between the two substantially simultaneous 511 keV detection events is used to further localize the positron along the line of response.

In SPECT, the radionuclide emits single radiation particles, and a "line of response" or narrow-angle "cone of response" or a "plane of response" is defined by a radiation collimator disposed on the face of the radiation detector.

In radionuclide imaging of biological subjects or other radiation-sensitive subjects, the amount of administered or infused radionuclide is preferably or necessarily kept low. As a result, the frequency of radiation detection events is low, and a Geiger detection mode is used in which individual radiation detection events are counted. Another consequence is that noise due to background radiation, scatter, or other sources of false detection events is of considerable concern. These false detection events can be filtered by the use of energy windowing and, in the case of PET, by time windowing. For example, in PET the particles of interest are 511 keV gamma particles, and so detection events corresponding to particles of energy well away from 511 keV can be filtered out. In the case of PET, the expectation of two substantially simultaneous 511 keV detection events provides a second, time-based filter. Energy windowing is relatively less effective for filtering out scattered radiation, since the energy change due to a scattering event may be small.

The optimal energy window for filtering out scatter events depends on the distribution of scatter-induced energy changes, which can be subject-specific. It is known to select a subject-specific fixed energy window based on the detected radiation events. See, e.g. Wells et al., "Optimal Energy Window Selection for Scintigraphy & Emission Computed Tomography", IEEE Nuclear Science Symposium Conference Record (2005). The accuracy and reliability of the approach of Wells is constrained by the low radiation event count rate for subjects infused with a low dosage of radionuclide. If the energy window selected is not optimal for the imaging application or subject, then the radiation detection events accepted and used for the image reconstruction are also not optimal, leading to a reconstructed image that is not optimal.

The following provides new and improved apparatuses and methods which overcome the above-referenced problems and others.

In accordance with one disclosed aspect, an imaging system comprises: means for storing radionuclide imaging data including quantitative radiation detection event energy values, the radionuclide imaging data having been acquired of a subject by a radionuclide imaging device; means for filtering the stored radionuclide imaging data respective to the stored quantitative radiation detection event energy values to generate a filtered radionuclide imaging data set; and means for reconstructing the filtered radionuclide imaging data set to generate a reconstructed image of the subject.

In accordance with another disclosed aspect, a method comprises: storing radionuclide imaging data including quantitative radiation detection event energy values, the radionuclide imaging data having been acquired by radionuclide imaging of a subject; filtering the stored radionuclide imaging data respective to the stored quantitative radiation detection event energy values to generate a filtered radionuclide imaging data set; and reconstructing the filtered radionuclide imaging data set to generate a reconstructed image of the subject.

In accordance with another disclosed aspect, a method comprises: filtering radionuclide imaging data acquired by radionuclide imaging of a subject respective to quantitative radiation detection event energy values using first and different second energy windows to generate respective first and second filtered radionuclide imaging data sets; reconstructing the first and second filtered radionuclide imaging data sets to generate respective first and second reconstructed images of the subject.

In accordance with another disclosed aspect, a method comprises: generating a subject specific energy window for filtering radionuclide imaging data based on information not including radionuclide imaging data or a radionuclide image of the subject; filtering radionuclide imaging data acquired by radionuclide imaging of the subject respective to quantitative radiation detection event energy values using the generated subject specific filter to generate a filtered radionuclide imaging data set; and reconstructing the filtered radionuclide imaging data set to generate a reconstructed image of the subject.

In accordance with another disclosed aspect, a system comprises a storage medium and a digital processor are configured to perform a method as set forth in any one of the three immediately preceding paragraphs. In accordance with another disclosed aspect, a storage medium stores instructions that are executable by a digital processor to perform a method as set forth in any one of the three immediately preceding paragraphs.

One advantage resides in radionuclide imaging in which the scatter correction is performed retrospectively.

Another advantage resides in radionuclide imaging in which the scatter correction is performed using an energy window optimized for a particular application.

Another advantage resides in radionuclide imaging in which the scatter correction is performed retrospectively using different energy windows optimized for different applications.

Further advantages will be apparent to those of ordinary skill in the art upon reading and understand the following detailed description.

FIG. 1 diagrammatically shows an radionuclide imaging system with scatter correction.

Figure 2:
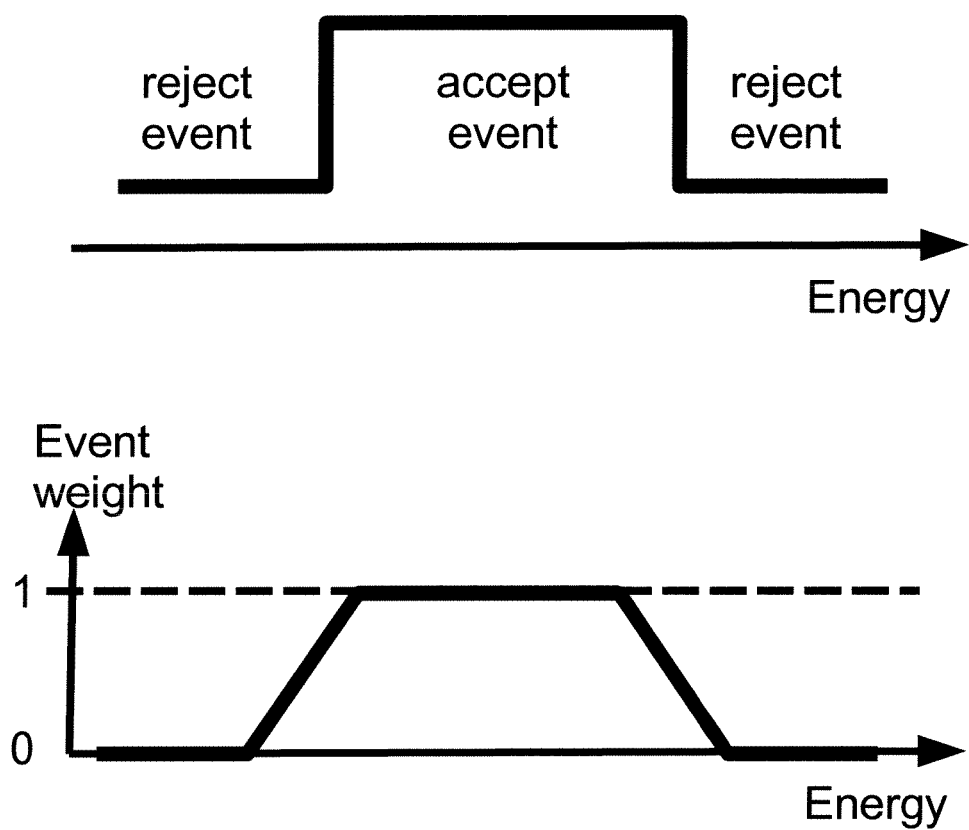

FIG. 2 diagrammatically shows two illustrative energy windows.

Figure 3:
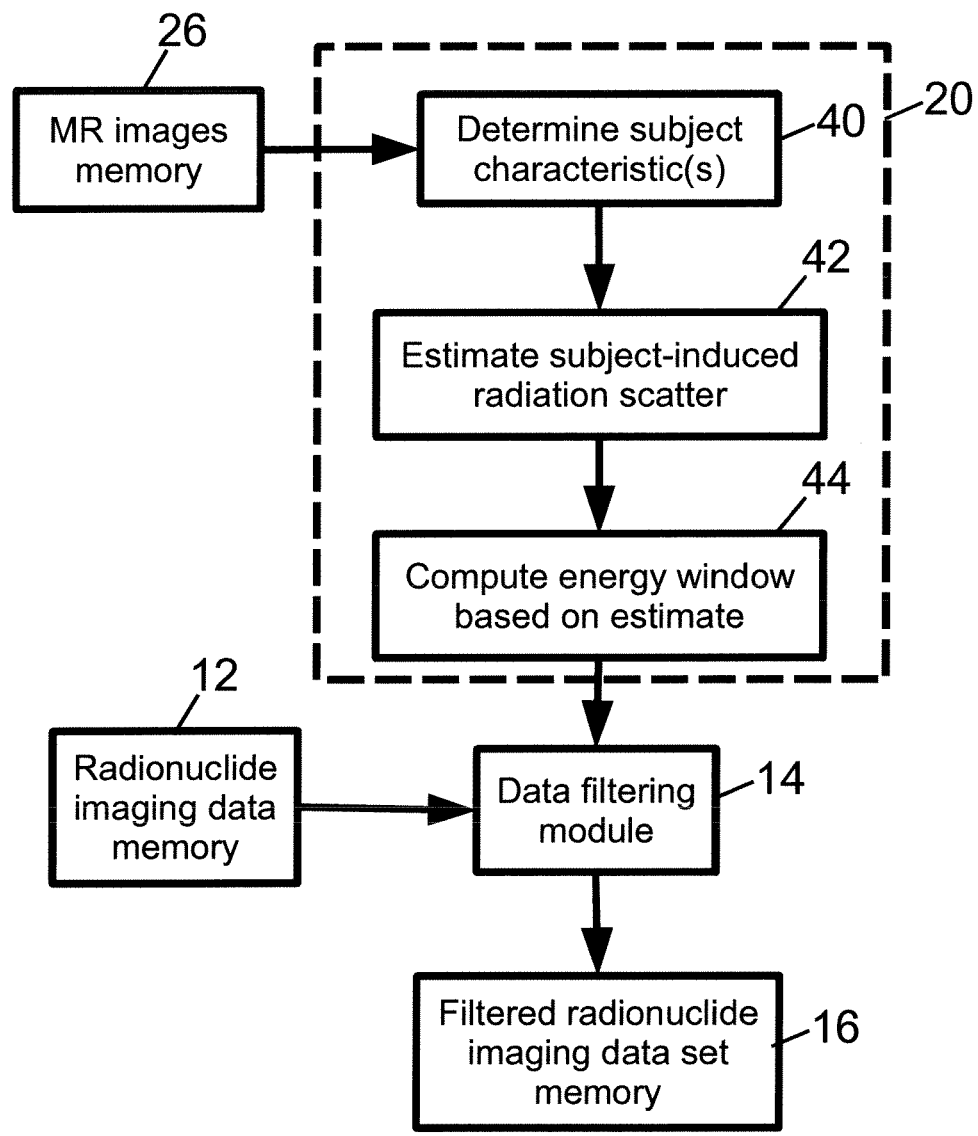
Figure 4:
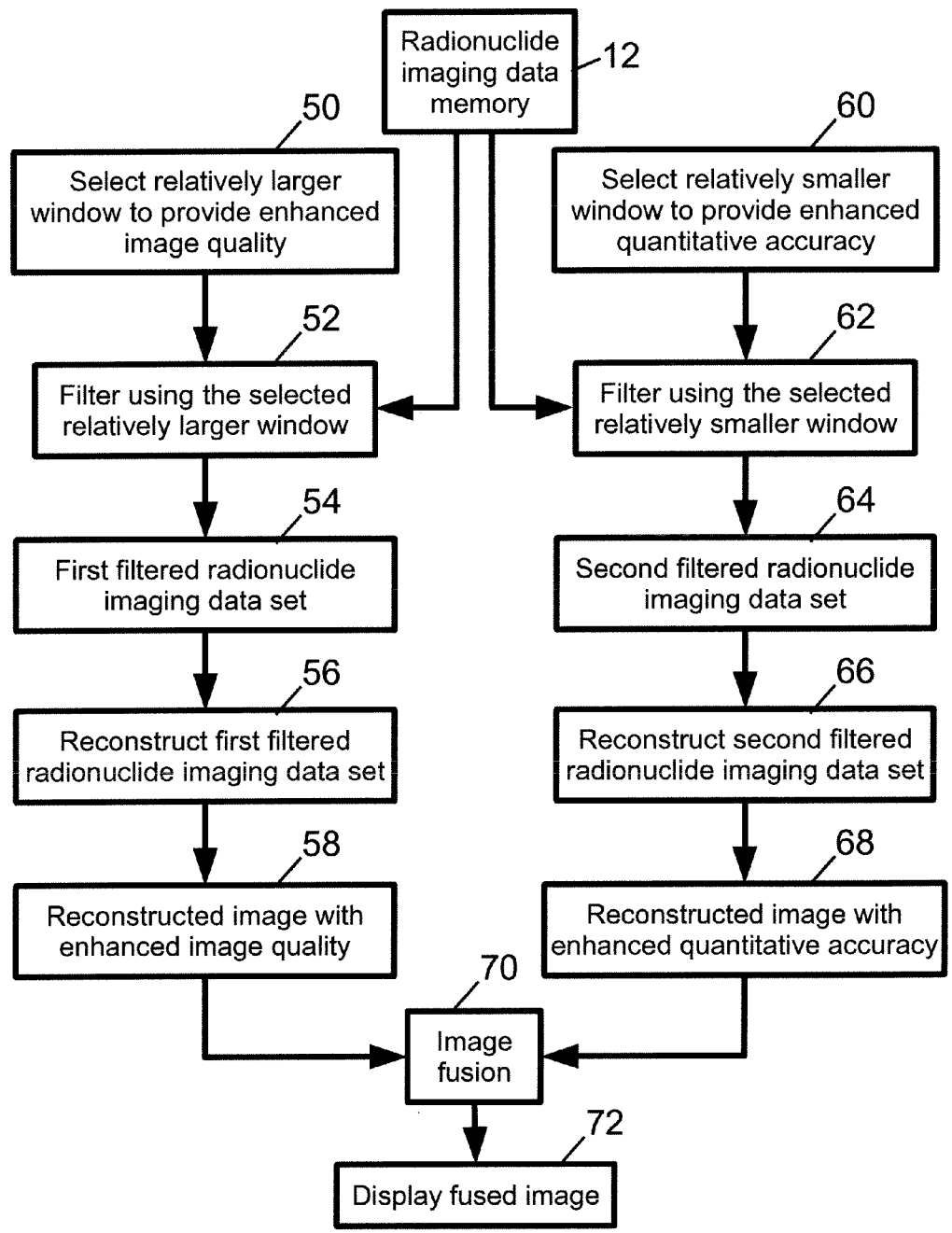

FIGS. 3-4 diagrammatically flowchart imaging data processing suitably performed by the system of FIG. 1.

With reference to FIG. 1, a radionuclide imaging system includes a radionuclide imaging device 10, which in the illustrative embodiment of FIG. 1 is an illustrative positron emission tomography (PET) scanner 10 used to acquire PET imaging data. Alternatively, another radionuclide imaging device could be provided, such as a gamma camera used to acquire single photon emission computed tomography (SPECT) imaging data. The illustrated PET scanner 10 can be suitably embodied, for example, by the PET imaging component of a computed tomography (CT)/PET imaging scanner such as a Gemini™ CT/PET system available from Koninklijke Philips Electronics N. V. (Eindhoven, the Netherlands), or by a standalone PET scanner. A gamma camera for SPECT imaging can be embodied, for example, by a BrightView™, Precedence™, or SKYLight™ SPECT system available from Koninklijke Philips Electronics N. V. (Eindhoven, the Netherlands), and may optionally also include integrated CT capability. These are merely illustrative examples, and other embodiments of the radionuclide imaging device 10 are also contemplated.

An imaging subject, such as a human imaging subject, an animal imaging subject, or an inanimate imaging subject, is loaded into an imaging area 11 of the radionuclide imaging device 10. The imaging subject is infused with a radionuclide that emits radiation at a characteristic energy or over a characteristic energy spectrum. For imaging of a biological subject such as a human or animal, a typical approach is to administer to the subject a radiopharmaceutical containing the radionuclide, for example intravenously, orally, or by another entry pathway. As the radionuclide emits radiation at a characteristic energy or over a characteristic energy spectrum, the radionuclide imaging device 10 detects radiation events so as to acquire radionuclide imaging data. The acquired radionuclide imaging data provides information about the distribution of radionuclide in the subject. For example, if the radionuclide is carried by a radiopharmaceutical designed to accumulate in an organ of interest, then the acquired radionuclide imaging data provides information about the organ of interest. Radionuclide imaging can also be used for other purposes, such as to characterize metabolic processes (e.g., functional imaging), to identify regions of tissue necrosis, or so forth.

The radionuclide imaging device 10 acquires radionuclide imaging data including quantitative radiation detection event energy values, and stores these data in a radionuclide imaging data memory 12. In some embodiments, the acquired radionuclide imaging data are stored in the memory 12 in a list mode that includes time, energy, and position information for each radiation detection event. For PET imaging data the list mode storage can, for example, take the form: <time1, energy1, pos1, time2, energy2, pos2> where time1, energy1, and pos1 denote the time, energy, and position of a first gamma ray detection event and time2, energy2, and pos2 denote the time, energy, and position of a second gamma ray detection event of a substantially simultaneously occurring pair of gamma ray detection events. For PET data, coincidence time windowing and optional initial energy windowing around 511 keV are used to identify candidate substantially simultaneously occurring pairs of gamma ray detection events. The storage of both time1 and time2 enable time-of-flight (TOF) processing during image reconstruction so as to further localize the electron-positron annihilation event along the line-of-response (LOR) connecting the substantially simultaneously occurring pair of gamma ray detection events. If TOF processing is not used, then optionally a single time may be stored for both events of the substantially simultaneously occurring pair of gamma ray detection events.

For SPECT imaging data the list mode storage can, for example, take the form: <time, energy, pos> where time, energy, and pos denote the time, energy, and position of a single radiation detection event. Optionally, an initial broad energy window can be used to identify candidate ray detection events whose energy is close to the energy of the emission energy of the radionuclide used in the radionuclide imaging. In the case of SPECT, a LOR is defined based on collimation provided by a radiation collimator mounted with the radiation detector.

Although list mode data including time, energy, and positional information is advantageous, it is also contemplated to omit storage of the time information. The optional initial energy windowing, if used, preferably employs a relatively wide energy window that is designed to accept most or all radiation detection events corresponding to the emission energy of the radionuclide used in the radionuclide imaging as well as some extraneous or noise radiation detection events.

The stored radionuclide imaging data is filtered by a data filtering module 14 respective to the stored quantitative radiation detection event energy values in order to generate a filtered radionuclide imaging data set that is stored in a memory 16. One purpose of the energy filtering is to remove radiation detection events corresponding to subject-induced radiation scatter. Even though scattered radiation may be generated by the radionuclide, the scattering causes the trajectory of the radiation particle to change, which in turn compromises the value of the scattered radiation particle detection event for imaging purposes. Radionuclide emission that has undergone inelastic or partially inelastic scatter has its energy changed, and thus can be detected and filtered out by suitable energy filtering. However, as disclosed herein the choice of an optimal energy window for the energy filtering depends on various factors including subject geometry, the purpose for which the reconstructed radionuclide image is intended, and so forth. Accordingly, the optional prospective energy windowing performed during acquisition is preferably not used for this purpose, and instead retroactive energy filtering performed by the data filtering module 14 is used to address subject-induced radiation scatter.

With continuing reference to FIG. 1 and with brief reference to FIG. 2, an energy window selection module 20 selects the energy window for the retroactive energy filtering performed by the data filtering module 14. As used herein, the term "energy window" is intended to broadly encompass variations such as the use of multiple energy windows (not illustrated, but suitable for example in the case of multiple radionuclide imaging), and the use of non-abrupt or "feathered" window edges that weight radionuclide imaging data at the energy periphery. FIG. 2 illustrates this later variation. The top plot of FIG. 2 illustrates an energy window with abrupt edges, in which events whose energy lies within the window are accepted or retained and events whose energy lies outside the window are rejected or filtered out. The bottom plot of FIG. 2 illustrates an energy window with non-abrupt or feathered window edges. This energy window defines event weights as indicated by the ordinate of the bottom plot. Events whose energy lies well within the window are assigned weight values of unity or "1", and hence are fully retained. Events whose energy lies well outside the window are assigned weight values of zero or "0", and hence are fully rejected or filtered out. Events whose energy lies in the transition region of the non-abrupt or feathered window edges are assigned weights between 0 and 1, and hence are retained but weighted to contribute less to the reconstructed image. Although the bottom plot of FIG. 2 shows linear non-abrupt window edges, other transitions are also contemplated such as parabolic, exponential, or otherwise-shaped window edges.

With continuing reference to FIG. 1, the energy window selection module 20 selects the energy window for the retroactive energy filtering performed by the data filtering module 14. Various criteria can be used for the energy window selection. For example, the energy window can be selected based on a size of a geometric dimension (e.g., height, girth, weight) of the subject. This information about the subject can be input by a radiologist or other user via a user interface 22 such as an illustrated computer, or can be determined based on a non-radionuclide image such as an image of the subject generated by an illustrative magnetic resonance (MR) scanner 24 and stored in an MR images memory 26. Other imaging modalities can also be used to generate the image from which subject geometry information is obtained. For example, a computed tomography (CT) image can be used. In some embodiments, the radionuclide imaging device 10 is a hybrid system including a radionuclide imaging modality such as PET or SPECT together with a CT imaging modality, which makes obtaining a CT image of the subject for use by the energy window selection module 20 advantageously convenient. In another approach, the radionuclide imaging data stored in the memory 12 is initially reconstructed without applying the data filtering module 14 to generate a coarse image of the subject from which the subject geometry information is derived.

Other criteria suitably used by the energy window selection module 20 in selecting the energy window for the retroactive energy filtering includes the purpose for which the reconstructed image is intended. For example, a relatively larger energy window retains more radionuclide imaging data which typically results in a more aesthetically pleasing image, that is an image with enhanced image quality as perceived visually. On the other hand, a relatively smaller energy window rejects more radionuclide imaging data but the remaining radionuclide imaging data after the filtering better matches the characteristic energy or energy spectrum of the radionuclide emission and contains less noise, and thus has enhanced quantitative accuracy and may be more suitable for quantitative image analysis. Advantageously, since the data filtering module 14 performs retrospective energy filtering based on the selected energy window, it is also possible and contemplated to reconstruct images using different energy windows, for example to produce an image with enhanced image quality for human viewing and another image with enhanced quantitative accuracy for quantitative analysis.

The data filtering module 14 performs data filtering at least respective to the stored quantitative radiation detection event energy values to generate a filtered radionuclide imaging data set that is stored in the memory 16. Optionally, the data filtering module 14 performs data filtering respective to one or more other parameters. For example, retrospective data filtering can be performed based on the positional information, for example to remove questionable imaging data acquired by a noisy radiation detector. As another example, retrospective data filtering can be performed based on the acquisition time, for example to remove imaging data during an interval that was compromised by an identified noise spike caused by an external noise source.

The radionuclide imaging data filtered by the data filtering module 14 and stored in the memory 16 is reconstructed by a reconstruction module 30 to generate a reconstructed image that is stored in a memory 32. The reconstruction module 30 can use any suitable image reconstruction algorithm that comports with the radionuclide imaging data. Some suitable image reconstruction algorithms include filtered backprojection, iterative backprojection, or so forth. Optionally, the image reconstruction algorithm includes image correction for radiation attenuation based on an attenuation map, for example as provided by a CT image or another source. An images fusion and formatting module 34 formats images for viewing or visualization on the user interface 22. Optionally, the images fusion and formatting module 34 generates a composite image by fusing two or more images. For example, a PET image may be fused with an MR image generated by the MR scanner 24 or two PET images reconstructed using different energy windows can be fused. The image fusion can use various image combination paradigms, such as showing one image in gray scale and using the other image to color-code the gray scale image.

The retrospective energy filtering provided by the data filtering module 14 using an energy window selected by the energy window selection module 20 provides substantial flexibility. The original data (optionally processed by coarse prospective energy filtering) is stored in the memory 12 as list mode data or in another data format that includes quantitative radiation detection event energy values. As a result, different energy windows can be selected and applied to assess the effect of the energy windowing on the resulting reconstructed image. In an additional or alternative approach, the energy window can optionally be iteratively refined by using an initially reconstructed radionuclide image as input to the energy window selection module 20 (diagrammatically indicated in FIG. 1 by a dotted line connecting the reconstructed images memory 32 to the energy window selection module 20). Some illustrative application examples follow.

With continuing reference to FIG. 1 and with further reference to FIG. 3, an illustrative example of selecting the energy window based on a size of a geometric dimension (height, girth, weight, or so forth) of the subject is described. In this illustrative example, an MR image of the subject is retrieved by the energy window selection module 20 from the MR images memory 26. In an operation 40, a subject characteristic is determined from the MR image. The subject characteristic should be probative of subject-induced radiation scatter. For example, the girth of a human subject affects the distance through biological tissue that a radiation particle emitted by radionuclide traverses in order to reach a radiation detector of the radionuclide imaging device 10. Thus, a larger girth is expected to correlate with statistically increased subject-induced radiation scatter, while a smaller girth is expected to correlate with statistically reduced subject-induced radiation scatter. In an operation 42, the amount of subject-induced radiation scatter is estimated based on the subject characteristic. The operation 42 can be based on an empirically generated look-up table or mathematical relationship that relates subject-induced radiation scatter and the subject characteristic.

If the amount of subject-induced radiation scatter is small, then most radiation emitted by the radionuclide infused in the subject should reach radiation detectors without scatter. In this case, a relatively small energy window can be selected which will retain most of the radionuclide imaging data. On the other hand, if the amount of subject-induced radiation scatter is large, then a substantial fraction of radiation particles emitted by the radionuclide infused in the subject can be expected to undergo a scattering event before reaching the radiation detector. In this case, a relatively larger energy window is suitably selected to retain more of the radionuclide imaging data, with the trade-off that some retained radionuclide imaging data may be due to scattered radiation that introduces some error in the reconstructed image.

Thus, in general it is advantageous to select a relatively larger energy window responsive to relatively higher assessed subject-induced radiation scatter, and to select a relatively smaller energy window responsive to relatively lower assessed subject-induced radiation scatter. In some embodiments, the energy window is selected to maximize a noise-equivalent count rate or density, which effectively balances the retention of a substantial fraction of the acquired radionuclide imaging data and rejection of a substantial fraction of noise due to subject-induced scatter. In an operation 44, the energy window is computed based on the estimated amount of subject-induced radiation scatter. This energy window is used by the data filtering module 14 to filter the radionuclide imaging data stored in the memory 12 to generate filtered radionuclide imaging data that is stored in the memory 16 and reconstructed to form a reconstructed image as described with reference to FIG. 1.

With continuing reference to FIG. 1 and with further reference to FIG. 4, an illustrative example of using retrospective energy windowing to generate different images optimized for different purposes is illustrated. In a first image reconstruction sequence, the energy window selection module 20 performs a selection operation 50 to select a relatively larger energy window that provides enhanced image quality. A filtering operation 52 is performed by the data filtering module 14 using the relatively larger energy window selected in the operation 50 to generate a first filtered radionuclide imaging data set 54 that is reconstructed by the reconstruction module 30 in an image reconstruction operation 56 to generate a reconstructed image with enhanced image quality 58.

In similar fashion, in a second image reconstruction sequence, the energy window selection module 20 performs a selection operation 60 to select a relatively smaller energy window that provides enhanced quantitative accuracy. A filtering operation 62 is performed by the data filtering module 14 using the relatively smaller energy window selected in the operation 60 to generate a second filtered radionuclide imaging data set 64 that is reconstructed by the reconstruction module 30 in an image reconstruction operation 66 to generate a reconstructed image with enhanced quantitative accuracy 68.

The two images 58, 68 are optionally fused in an operation 70 performed by the images fusion and formatting module 34 to generate a fused image that is displayed on the user interface 22 in a display operation 72. The image fusion can employ any suitable image fusion paradigm. In one approach, the reconstructed image with enhanced image quality 58 is displayed as a gray scale image that is color coded on the basis of intensity values of the reconstructed image with enhanced quantitative accuracy 68. In another approach, the reconstructed image with enhanced quantitative accuracy 68 is processed using a quantitative image processing algorithm to generate a processed image that provides color coding for a gray scale display of the reconstructed image with enhanced quantitative accuracy 68. For example, the reconstructed image with enhanced quantitative accuracy 68 can be used to compute a map of standardized uptake value (SUV) and the color coding can entail superimposing iso-SUV curves on the gray scale image. Instead of employing image fusion, the two reconstructed images 58, 68 can be displayed side-by-side or in another orientation.

The reconstructed image with enhanced quantitative accuracy 68 can be used in other ways. For example, in some embodiments the reconstructed image with enhanced quantitative accuracy 68 is used to compute quantitative analysis values. The reconstructed image with enhanced image quality 58 can then be displayed with the quantitative analysis values computed from the reconstructed image with enhanced quantitative accuracy 68 shown alongside (or under, or above) the image 58. It is also contemplated to store the different reconstructed images 58, 68 in different databases. For example, the reconstructed image with enhanced image quality 58 can be stored in a hospital information system (HIS) database while the image with enhanced quantitative accuracy 68 can be stored in a radiology information system (RIS) database.

Alternatively, a picture archiving and communications system (PACS) can store both images 58, 68, with the image retrieved by a PACS query depending upon the query source. Thus, for example, a query from the HIS database suitably retrieves the reconstructed image with enhanced image quality 58; whereas, a query from the RIS database suitably retrieves the reconstructed image with enhanced quantitative accuracy 68.

The disclosed retrospective energy windowing can be used in other ways. For example, in another approach a set of different energy windows of different positions and/or widths can be used to generate corresponding filtered radionuclide imaging data sets that are separately reconstructed and displayed together on the user interface 22. The user can then select and retain one or more of the reconstructed images that are deemed by the user to have the best image quality. Because the list mode data is available in memory 12, this can be done without additional imaging data acquisition.

Another example pertains in multiple radionuclide imaging in which the characteristic energy or characteristic energy spectrum of the two radionuclides are close in energy or have overlapping energy spectra. In this case, the energy windows for the two radionuclides can be adjusted by using several candidate energy window pairs, reconstructing an image for each candidate, and selecting the best images either manually or based on a suitable quantitative criterion such as minimizing image cross-correlation.

More generally, the energy window can be selected based on the protocol for which the image is to be used. Thus, different energy windows can be used for reconstructing an image for display versus for quantitative analysis (e.g., FIG. 4); but additionally different energy windows can be used for reconstructing images for different types of quantitative analyses, or for different displays or renderings, or so forth.

In FIG. 1, various processing components 14, 20, 30, 34 are illustrated diagrammatically. These various processing components 14, 20, 30, 34 can be variously embodied as one or more digital processors suitably programmed to perform the functions of the processing components 14, 20, 30, 34. It is also contemplated for one or more of the processing components to include one or more application-specific integrated circuitry (ASIC) components. For example, the reconstruction module 30 may include a dedicated ASIC image reconstruction processing pipeline performing a portion or all of the image reconstruction algorithm. In FIG. 1, the various memory components 12, 16, 26, 32 are illustrated diagrammatically. These various memory components 12, 16, 26, 32 can be variously embodied by one or more memory devices, such as one or more magnetic memory media such as a hard disk drive, one or more optical memory media such as an optical disk drive, one or more electronic memory media such as a FLASH memory, random access memory (RAM), or so forth, or various combinations thereof. Still further, the disclosed techniques can be embodied by a storage medium storing instructions that are executable by a digital processor to perform an embodiment of the disclosed methods. The storage medium storing the instructions may, for example, include one or more magnetic memory media such as a hard disk drive, one or more optical memory media such as an optical disk drive, one or more electronic memory media such as a FLASH memory, RAM, or so forth, or various combinations thereof.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

Having thus described the preferred embodiments, the invention is now claimed to be:

1. A non-transitory storage medium storing instructions executable by a digital processor to perform a method operating on stored radionuclide imaging data including quantitative radiation detection event energy values, the radionuclide imaging data having been acquired by radionuclide imaging of a subject, the method comprising:
   generating an energy window for use in filtering the radionuclide imaging data based on one of (i) a non-radionuclide image acquired of the subject and (ii) an initial reconstructed image generated by reconstructing the stored radionuclide imaging data;
   filtering the stored radionuclide imaging data respective to the stored quantitative radiation detection event energy values using the generated energy window to generate a filtered radionuclide imaging data set; and
   reconstructing the filtered radionuclide imaging data set to generate a reconstructed image of the subject.

2. The non-transitory storage medium as set forth in claim 1, wherein the generating comprises selecting the energy window for use in the filtering to maximize a noise-equivalent count rate or density.

3. The non-transitory storage medium as set forth in claim 1, wherein the generating comprises selecting the energy window for use in the filtering based on a size of a geometric dimension of the subject.

4. The non-transitory storage medium as set forth in claim 1, wherein the generating comprises:
   assessing subject-induced radiation scatter; and
   selecting the energy window for use in the filtering wherein a relatively larger energy window is selected responsive to relatively higher assessed subject-induced radiation scatter and a relatively smaller energy window is selected responsive to relatively lower assessed subject-induced radiation scatter.

5. The non-transitory storage medium claim of claim 1, wherein the generating comprises generating an energy window for use in filtering the radionuclide imaging data based on a non-radionuclide image acquired of the subject.

6. The non-transitory storage medium claim of claim 1, wherein the generating comprises generating an energy window for use in filtering the radionuclide imaging data based on an initial reconstructed image generated by reconstructing the stored radionuclide imaging data.

7. A non-transitory storage medium storing instructions executable by a digital processor to perform a method operating on stored radionuclide imaging data including quantitative radiation detection event energy values, the radionuclide imaging data having been acquired by radionuclide imaging of a subject, the method comprising:
   filtering the stored radionuclide imaging data respective to the stored quantitative energy values using a first energy window to generate a first filtered radionuclide imaging data set;
   reconstructing the first filtered radionuclide imaging data set to generate a first reconstructed image;
   filtering the stored radionuclide imaging data respective to the stored quantitative energy values using a second energy window different from the first energy window to generate a second filtered radionuclide imaging data set;
   reconstructing the second filtered radionuclide imaging data set to generate a second reconstructed image;
   displaying a fused image comprising a fusion of the first reconstructed image and the second reconstructed image.

8. A method comprising:
   storing radionuclide imaging data including quantitative radiation detection event energy values, the radionuclide imaging data having been acquired by radionuclide imaging of a subject;
   acquiring a non-radionuclide image of the subject;
   generating an energy window for use in filtering based on the non-radionuclide image of the subject;
   filtering the stored radionuclide imaging data respective to the stored quantitative radiation detection event energy values using the energy window to generate a filtered radionuclide imaging data set; and
   reconstructing the filtered radionuclide imaging data set to generate a reconstructed image of the subject.

9. The method as set forth in claim 8, wherein the acquiring a non-radionuclide image of the subject comprises acquiring one of (i) a magnetic resonance image of the subject and (ii) a transmission computed tomography image of the subject.

10. A method comprising:
   storing radionuclide imaging data including quantitative radiation detection event energy values, the radionuclide imaging data having been acquired by radionuclide imaging of a subject;
   filtering the stored radionuclide imaging data respective to the stored quantitative radiation detection event energy values to generate a filtered radionuclide imaging data set;
   reconstructing the filtered radionuclide imaging data set to generate a reconstructed image of the subject; and
   repeating the filtering and reconstructing wherein the second repetition of the filtering uses an energy window selected based on the reconstructed image of the subject generated by the first repetition of the reconstructing.

11. A method comprising:
   filtering radionuclide imaging data acquired by radionuclide imaging of a subject respective to quantitative radiation detection event energy values using first and different second energy windows to generate respective first and second filtered radionuclide imaging data sets;
   reconstructing the first and second filtered radionuclide imaging data sets to generate respective first and second reconstructed images of the subject; and
   displaying at least one of (i) a fused image comprising a fusion of the first and second reconstructed images of the subject and (ii) the first and second reconstructed images of the subject side-by-side or consecutively in time.

12. The method as set forth in claim 11, further comprising:
   performing said radionuclide imaging of the subject using one of (i) positron emission tomography (PET) imaging and (ii) single photon emission computed tomography (SPECT) imaging.

13. The method as set forth in claim 11, wherein the displaying includes displaying a fused image comprising a fusion of the first and second reconstructed images of the subject.

14. The method as set forth in claim 11, wherein the displaying includes displaying the first and second reconstructed images of the subject side-by-side or consecutively in time.

15. A method comprising:
   filtering radionuclide imaging data acquired by radionuclide imaging of a subject respective to quantitative radiation detection event energy values using first and different second energy windows to generate respective first and second filtered radionuclide imaging data sets; and
   reconstructing the first and second filtered radionuclide imaging data sets to generate respective first and second reconstructed images of the subject;
   wherein the first energy window is relatively larger to provide the first reconstructed image with enhanced image quality and the second energy window is relatively smaller to provide the second reconstructed image with enhanced quantitative accuracy.

16. The method as set forth in claim 15, further comprising:
   simultaneously displaying (i) the first reconstructed image with enhanced image quality and (ii) one or more quantitative analysis values computed from the reconstructed image with enhanced quantitative accuracy.

17. A method comprising:
   filtering radionuclide imaging data acquired by radionuclide imaging of a subject respective to quantitative radiation detection event energy values using first and different second energy windows to generate respective first and second filtered radionuclide imaging data sets; and
   reconstructing the first and second filtered radionuclide imaging data sets to generate respective first and second reconstructed images of the subject;
   wherein the first energy window is selected to provide the first reconstructed image optimized for a first protocol and the second energy window is selected to provide the second reconstructed image optimized for a second protocol different from the first protocol.

* * * * *